(12) United States Patent
Choi et al.

(10) Patent No.: US 7,771,599 B1
(45) Date of Patent: Aug. 10, 2010

(54) SYSTEM AND METHOD FOR USING CARBON DIOXIDE SEQUESTERED FROM SEAWATER IN THE REMINERALIZATION OF PROCESS WATER

(75) Inventors: Young Chul Choi, Tampa, FL (US); Chunwoo Lee, Tampa, FL (US); Elvira Fernandez Sanchis, Kissimmee, FL (US)

(73) Assignee: Doosan Hydro Technology, Inc., Tampa, FL (US)

( * ) Notice: Subject to any disclaimer, the term of this patent is extended or adjusted under 35 U.S.C. 154(b) by 0 days.

(21) Appl. No.: 12/400,765

(22) Filed: Mar. 9, 2009

(51) Int. Cl.
*B01D 61/00* (2006.01)
*B01D 61/02* (2006.01)
*B01D 61/08* (2006.01)

(52) U.S. Cl. .......... 210/652; 210/321.6; 210/257.2; 210/644; 210/639; 210/651; 96/6; 95/46; 95/51; 95/156

(58) Field of Classification Search ......... 210/638, 210/636
See application file for complete search history.

(56) References Cited

U.S. PATENT DOCUMENTS

| | | | | |
|---|---|---|---|---|
| 4,222,825 | A * | 9/1980 | Eisden ................... | 203/11 |
| 5,399,261 | A * | 3/1995 | Martin et al. ............ | 210/195.1 |
| 5,525,224 | A * | 6/1996 | Funahashi et al. ........ | 210/205 |
| 5,695,646 | A * | 12/1997 | Graf ................... | 210/716 |
| 5,833,841 | A * | 11/1998 | Koslowsky ............ | 210/96.1 |
| 5,993,737 | A * | 11/1999 | Mackintosh et al. ..... | 422/14 |
| 6,093,321 | A * | 7/2000 | Bonnelye et al. ........ | 210/610 |
| 6,572,902 | B2 * | 6/2003 | Abramowitz et al. ..... | 426/66 |
| 6,863,819 | B2 * | 3/2005 | Maree ................... | 210/631 |
| 7,374,694 | B2 * | 5/2008 | Gaudinot et al. ........ | 210/752 |
| 2003/0019818 | A1 * | 1/2003 | Carson et al. .......... | 210/764 |
| 2004/0104180 | A1 * | 6/2004 | Gaudinot et al. ........ | 210/749 |
| 2006/0091077 | A1 * | 5/2006 | Haas et al. ............ | 210/641 |

OTHER PUBLICATIONS

Yamuchi, Y., Tanaka, K., Hattori, K., Kondo, M., Ukawa, N.; Remineralization of Desalinated water by limestone dissolution filter, 1987, Desalination, 66, 365-383.*

'Green' Desalination, Nov. 11, 2008, http://eponline.com/articles/2008/11/11/green-desalination.aspx, accessed Mar. 8, 2010 online.*

U.S. Army Corps of Engineers; Naval Facilities Engineering Command; Air Force Civil Engineer Support Agency; Unified Facilities Criteria (UFC): Water Desalination; Jan. 16, 2004, 1-118.*

Zidouri, H.; Desalination in Morocco and presentation of design and operation of the Laayoune seawater reverse osmosis plant, Desalination, 2000, 131, 137-145.*

(Continued)

*Primary Examiner*—Krishnan S Menon
*Assistant Examiner*—Allison Gionta
(74) *Attorney, Agent, or Firm*—GrayRobinson, P.A.; Michael J. Colitz, III (57) ABSTRACT

Disclosed is an improved method for the remineralization of process water in a desalination system. The method sequesters carbon dioxide gas ($CO_2$) from seawater or concentrate (brine) of desalination process via a gas transfer membrane. The sequestered carbon dioxide gas ($CO_2$) is thereafter used in the production of soluble calcium bicarbonate ($Ca(HCO_3)_2$). The calcium bicarbonate ($Ca(HCO_3)_2$) adds hardness and alkalinity to the resulting process water.

5 Claims, 10 Drawing Sheets

OTHER PUBLICATIONS

Membrana, Liqui-Cel Membrane Contactors, Carbon Dioxide and Water TechBrief, 2007.*

Yamauchi, Y. et al. Remineralization of Desalinated Water by Limestone Dissolution Filter. Desalination. 1987, vol. 66, pp. 365-383.

Membrana, Liqui-Cel Membrane Contractors, Carbon Dioxice and Water. TechBrief, 2007.

Green. Carlsbad project develops plan to mitigate its carbon footprint. Desalination. Environmental Protection. Nov. 11, 2008.

Zidouri, H. Desalination in Morocco and presentation of design and operatioh of the Laayounse seawater reverse osmosis plant. Desalination. 2000, vol. 131, pp. 137-145.

* cited by examiner

SYSTEM AND METHOD FOR USING CARBON DIOXIDE SEQUESTERED FROM SEAWATER IN THE REMINERALIZATION OF PROCESS WATER

BACKGROUND OF THE INVENTION

1. Field of the Invention

This invention relates to the remineralization of process water in a desalination process. More particularly, the present invention relates to using carbon dioxide sequestered from seawater, or concentrates called brines, to remineralize desalinated water produced using membrane processes, thermal processes, or other alternative processes.

2. Description of the Background Art

Known desalination systems use reverse osmosis (RO) filters, or thermal energy, or electrical current, to create pure water ($H_2O$) from seawater. Desalinated water by itself, however, is not suitable for human consumption and is highly corrosive to distribution systems, such as pipelines and plumbing. This is because pure processed water has a lower pH by dissolution of carbon dioxide in atmosphere and is devoid of key minerals. Thus, known desalination systems require a post-treatment or remineralization process. In this process minerals, such as calcium and carbonates, are added back to the desalinated water. This remineralization step adds taste and reduces the corrosive effects of the water.

Known remineralization processes add gaseous carbon dioxide ($CO_2$) and either calcium hydroxide ($Ca(OH)_2$) or calcium carbonate ($CaCO_3$). These react with the water ($H_2O$) to form a soluble calcium bicarbonate($Ca(HCO_3)_2$). Calcium bicarbonate ($Ca(HCO_3)_2$) increases the pH and otherwise adds both alkalinity and hardness to the water. The result is water that is better tasting and less corrosive. Current remineralization techniques deliver the gaseous carbon dioxide ($CO_2$) via commercial suppliers or the on-site burning of fossil fuels. However, commercial carbon dioxide ($CO_2$) supplies can be expensive and can substantially increase the price per gallon of the resulting water. On-site burning of fossil fuels is also not an acceptable alternative due to the creation of damaging green house gases.

Thus, there exists a need in the art for a remineralization processes that does not require an external supply of carbon dioxide ($CO_2$). There is also a need in the art for a remineralization process that is more cost effective and that is not damaging to the environment.

The present invention is aimed at fulfilling these needs.

SUMMARY OF THE INVENTION

It is therefore one of the objectives of this invention to enable the remineralization of process water without the need for an external supply of carbon dioxide.

It is a further object of this invention to remineralize process water without having to burn fossil fuels.

It is also one of the objectives of this invention to provide a desalination system wherein the carbon dioxide used for remineralization is sequestered from seawater or waste streams from seawater desalination processes.

It is still yet another object of this invention to reduce scale and inorganic fouling on membranes used in desalination processes.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to an improved method for remineralizing in a desalination system preferring reverse osmosis (RO) permeate. In accordance with the method, carbon dioxide gas ($CO_2$) is sequestered from seawater or the concentrate of desalination processes via a gas transfer membrane. The carbon dioxide gas ($CO_2$) is thereafter used in the production of soluble calcium bicarbonate ($Ca(HCO_3)_2$). The calcium bicarbonate ($Ca(HCO_3)_2$) adds hardness and alkalinity to the desalinated water so as to yield potable water. The various details of the present invention, and the manner in which they interrelate, are described in greater detail hereinafter.

Figure 1:
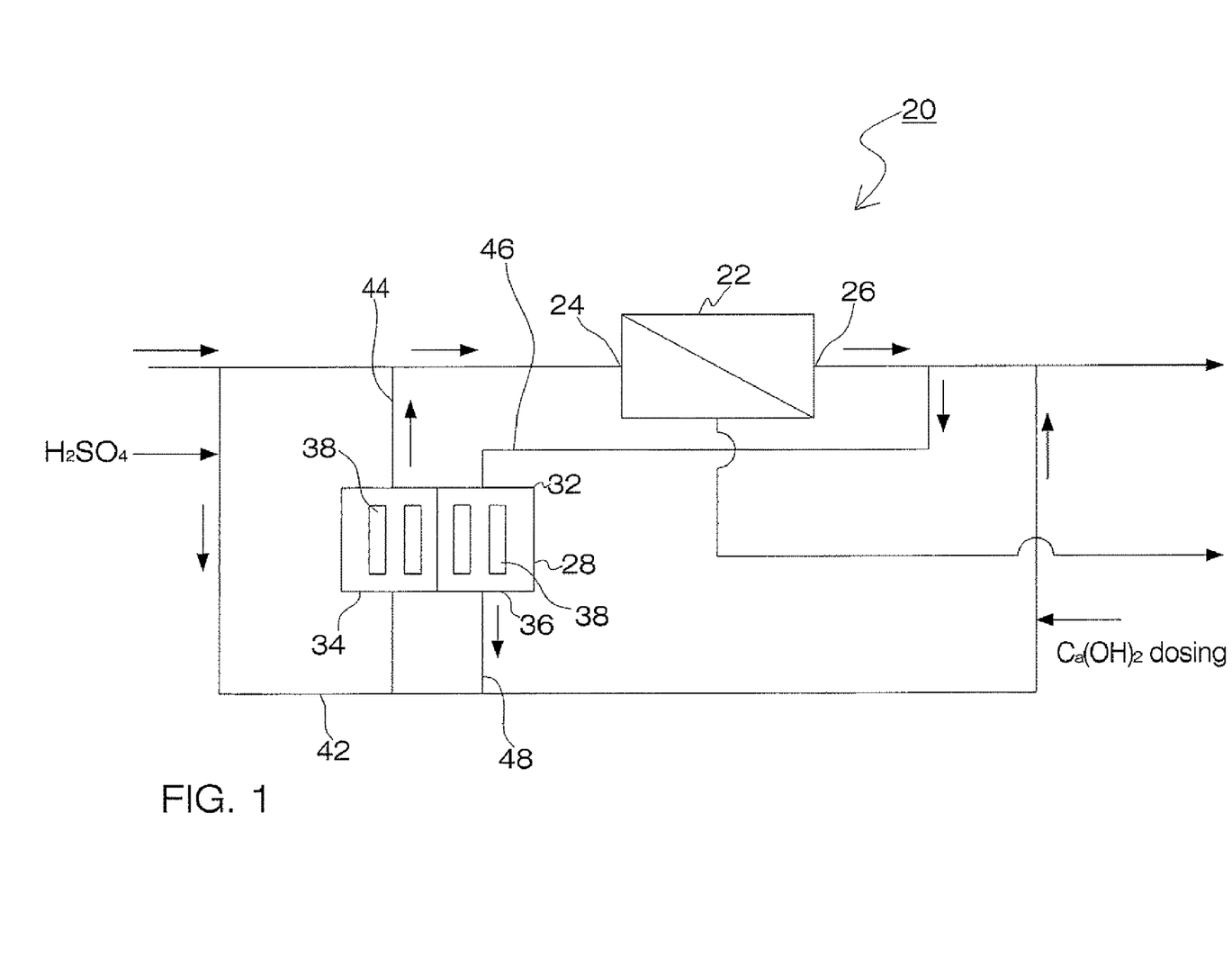
FIG. 1 is a process diagram illustrating the remineralization system of the present invention.

With reference to FIG. 1, a specific embodiment of the method of the present invention is depicted, along with the basic components of a water desalination system 20. The desalination system includes a conventional reverse osmosis (RO) filter 22, including an upstream inlet 24 for seawater and a downstream outlet 26 for the RO permeate.

The present invention further includes a hydrophobic gas transfer apparatus 28. A suitable gas transfer apparatus is sold by Membrana Corporation of Charlotte, N.C. under the trademark Liqui-Cel®. Those of ordinary skill in the art will appreciate other suitable gas transfer devices after considering the invention. Ideally, the transfer apparatus 28 includes a housing 32 with two counter current flow channels (34 and 36). However, those of ordinary skill in the art will appreciate that co-current flow channels can also be used. These flow channels (34 and 36) are separated by one or more membranes 38. The membranes 38 include pores that are of a sufficient size to allow only the transfer of $CO_2$ gas therethrough. Each flow channel of the membrane has both upstream and downstream ends. That is, the first flow channel 34 has an upstream end 42 and a downstream end 44. Likewise, the second flow channel 36 includes an upstream end 46 and a downstream end 48. As is evident from FIG. 1, seawater, which can be drawn from the ocean, is supplied to the upstream end 42 of first flow channel 34. The second flow channel 36 is coupled to the output of the RO filter 22. Thus, the upstream end 46 of second flow channel 36 is supplied with RO permeate.

In accordance with the preferred method, sulfuric acid ($H_2SO_4$) is added to the seawater. Other acids are also applicable to lower the pH. As illustrated in the embodiment of FIG. 1, the acid is added at the upstream end 42 of the first flow channel 34. The addition of the acid creates an acidified seawater solution. The present invention can also be used in association with a brine solution, in which case the addition of the acid creates an acidified brine solution. Bicarbonate ($HCO_3^-$) within the seawater then reacts with the sulfuric acid ($H_2SO_4$) to produce carbon dioxide ($CO_2$) gas. This reaction is carried out in accordance with Equation 1 below:

$$H_2SO_4 + HCO_3^- \rightarrow CO_2 \qquad \text{Eq. 1}$$

The gaseous carbon dioxide ($CO_2$) created in accordance with Equation 1 then becomes entrained within the seawater. The seawater and entrained carbon dioxide gas thereafter pass through the first flow channel 34 and encounter membranes 38. As the entrained carbon dioxide gas traverses flow channel 34, it passes through the pores of the membranes 38 and, thereby, passes from the first to the second flow channels (34 and 36). The gaseous carbon dioxide ($CO_2$) is then dissolved within the RO permeate passing through the second flow channel 36. The resulting alkalinity of the RO permeate is thereby increased, ideally to a level that is higher than 50 to 70 milligrams per liter.

In the next step, calcium hydroxide ($Ca(OH)_2$) is added at the downstream end 48 of the second flow channel 36. The sequestered carbon dioxide ($CO_2$), dissolved in the desalinated water, then reacts with the added calcium hydroxide ($Ca(OH)_2$) to produce calcium bicarbonate ($Ca(HCO_3)_2$) in accordance with the following equation:

$$Ca(OH)_2 + CO_2 \rightarrow Ca(HCO_3)_2 \qquad \text{Eq. 2}$$

The resulting calcium bicarbonate ($Ca(HCO_3)_2$) is then routed to and mixed with the RO permeate. The calcium bicarbonate ($Ca(HCO_3)_2$) adds the necessary hardness and alkalinity to make the water ($H_2O$) potable and non corrosive. Ideally, the alkalinity concentration of the RO permeate should be above 50 to 70 milligrams per liter.

Figure 2:
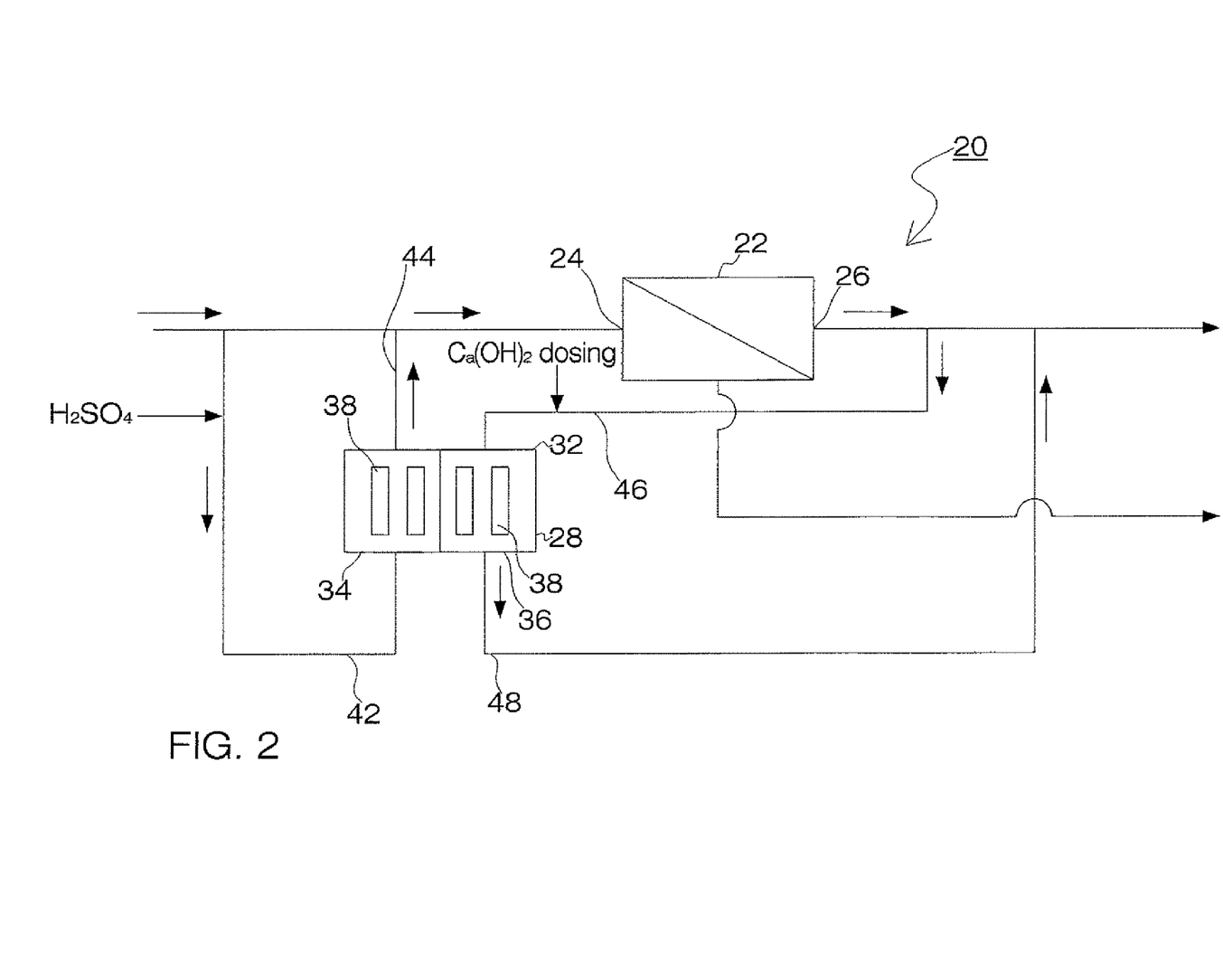
FIG. 2 is a process diagram illustrating an alternative remineralization system of the present invention.
Figure 3:
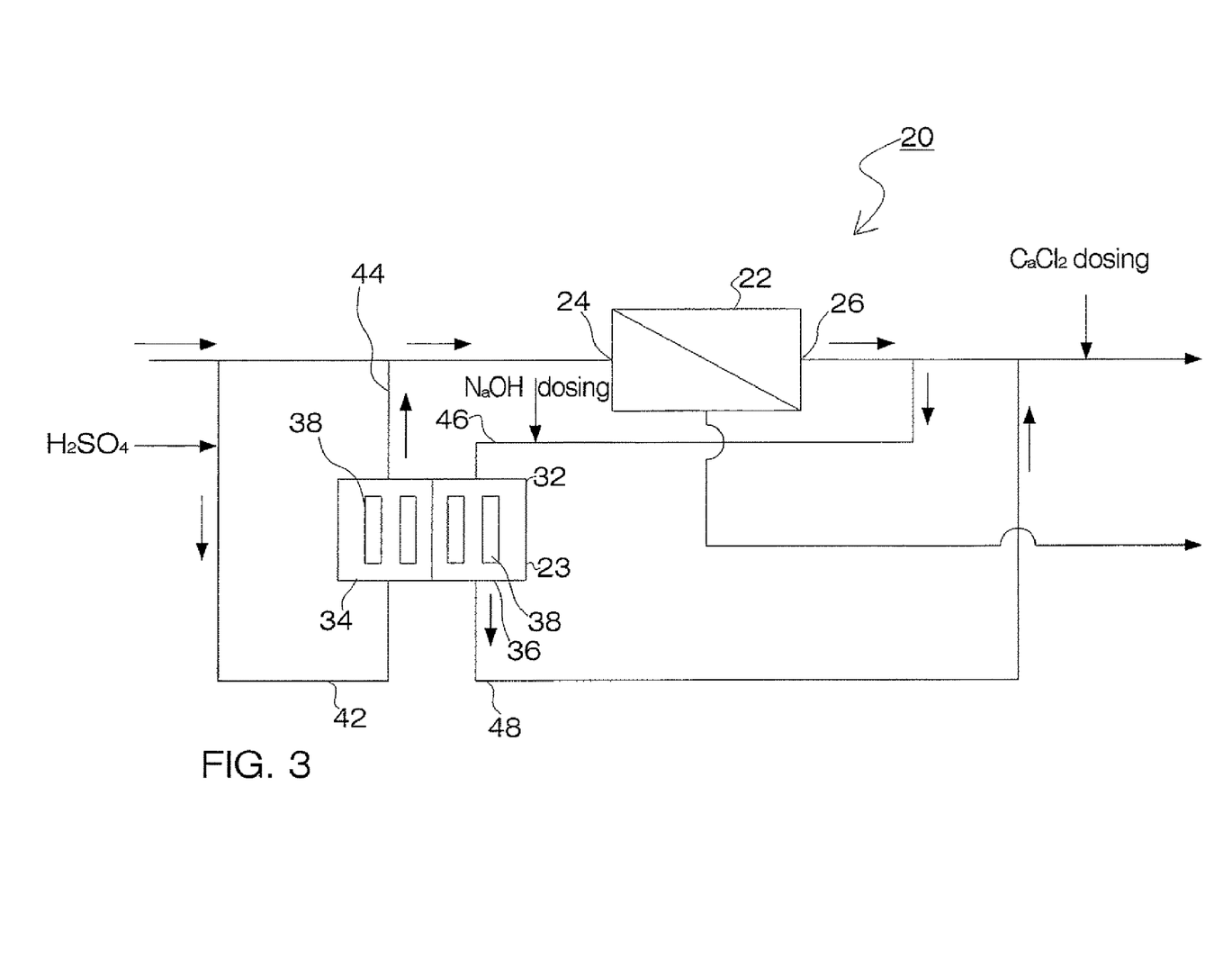
FIG. 3 is a process diagram illustrating an alternative remineralization system of the present invention.

Various alternative embodiments of the present invention are described next. With regard to FIG. 2, applicants have discovered that increasing the pH of the permeate increases the transfer rate of the carbon dioxide ($CO_2$) through membranes 38. Thus, in this embodiment, calcium hydroxide ($Ca(OH)_2$) is added at the upstream end 46 of the second flow channel 36 to thereby increase the pH of the permeate and facilitate greater transfer rates across membranes 38. The system depicted in FIG. 3 is the same in all respects as the system of FIG. 2, however, sodium hydroxide (NaOH) is used in lieu of calcium hydroxide ($Ca(OH)_2$) to increase the pH.

Figure 4:
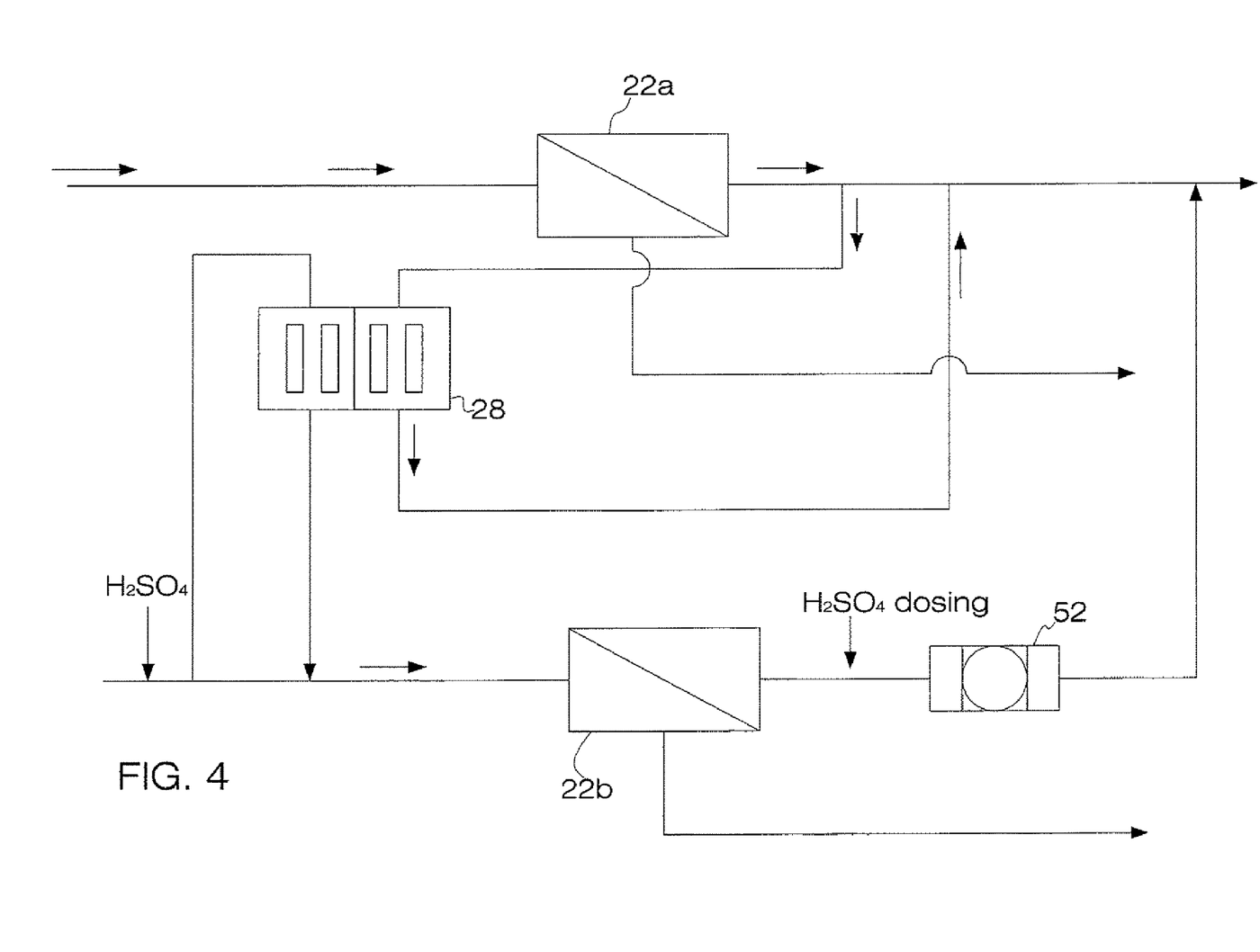
FIG. 4 is a process diagram illustrating an alternative remineralization system of the present invention.

The system depicted in FIG. 4 includes two RO trains (22a and 22b). In this system, the first train 22a produces a high pH RO permeate (i.e. 7.0 to 8.0 pH) and the second train 22b produces a lower pH permeate (i.e. 4.5 to 6.0 pH). The lowered pH seawater and the higher pH RO permeate from the first RO train 22a then pass through the gas transfer assembly 28 wherein carbon dioxide ($CO_2$) is passed from the first the second flow channel (34 and 36). This method further includes a limestone filter 52 for remineralizing the output of the second RO filter 22b. Limestone is known as a means for remineralization and can be used to supplement the remineralization provided by the present system.

Figure 5:
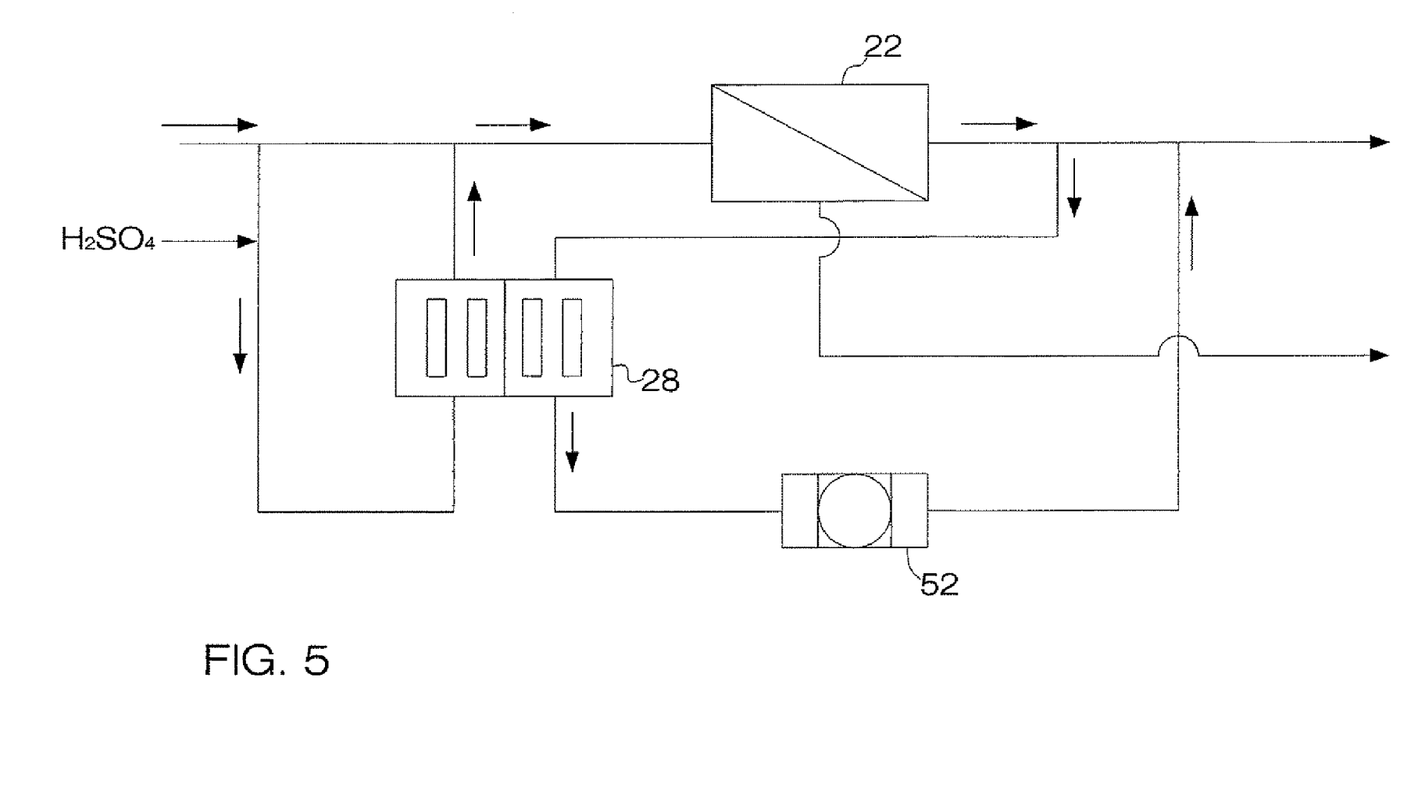
FIG. 5 is a process diagram illustrating an alternative remineralization system of the present invention.
Figure 6:
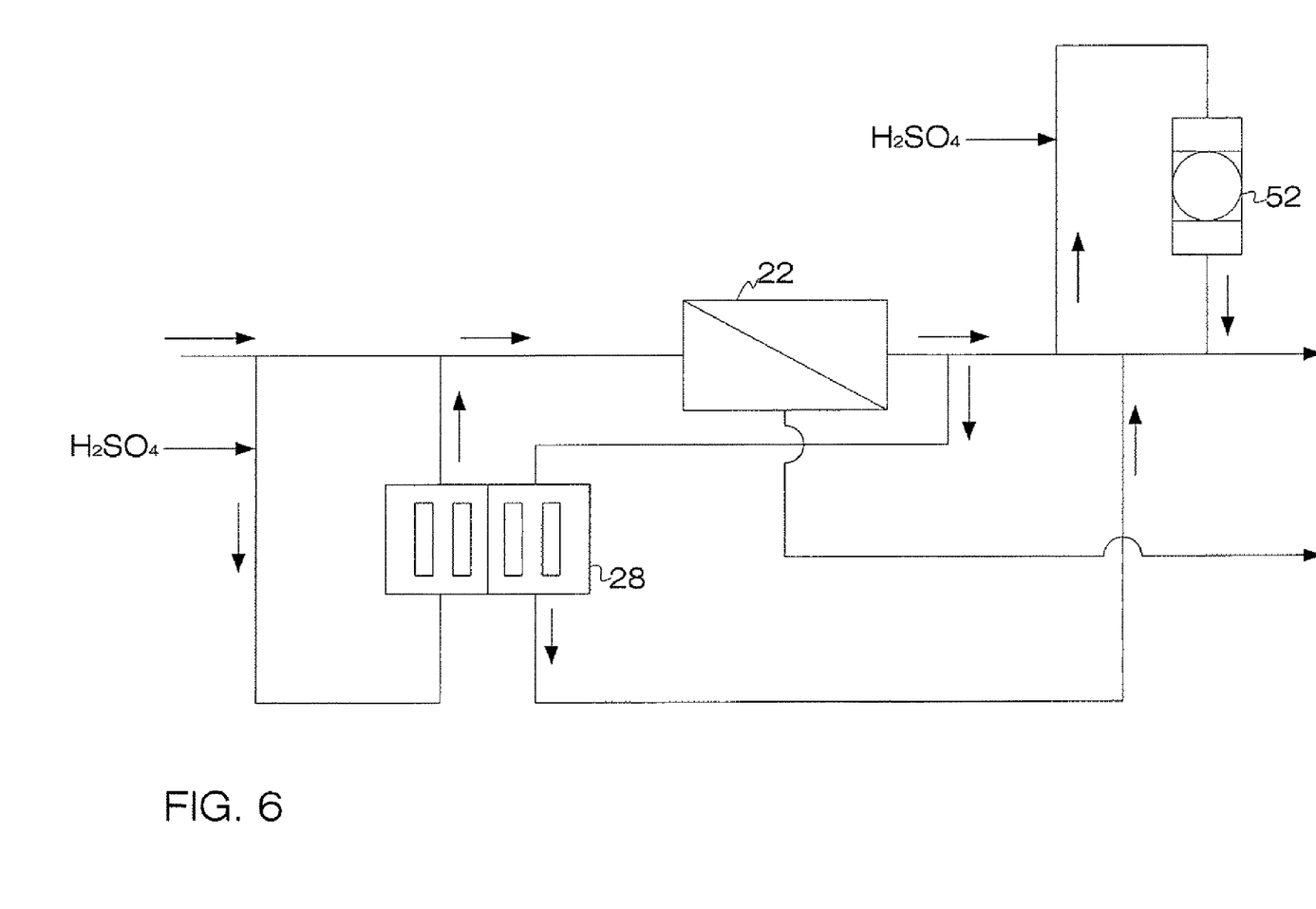
FIG. 6 is a process diagram illustrating an alternative remineralization system of the present invention.

FIGS. 5 and 6 are further examples of systems wherein further remineralization is carried out via a limestone filter. Namely, in FIG. 5, limestone filter 52 is positioned at the downstream end 48 of second flow channel 36. In FIG. 6, the limestone filter 52 is included at the output of RO filter 22. Additionally in FIG. 6 the pH of the permeate is lowered prior to passage through the limestone filter 52.

FIGS. 7-10 illustrate still further alternative embodiments of the present invention. In these alternative embodiments, carbon dioxide ($CO_2$) is sequestered from concentrated brine as opposed to seawater. Namely, in each of the disclosed embodiments, the inlet to the first flow channel 34 is coupled to the brine outlet of the RO filter 22. As in the primary embodiment, sulfuric acid ($H_2SO_4$) is added to produce carbon dioxide ($CO_2$) in accordance with Equation 1 above. However, in the case of the embodiments depicted in FIGS. 7-10, the bicarbonate ($HCO_2^-$) necessary for the reaction is found in the brine concentrate 22 and not seawater.

Figure 7:
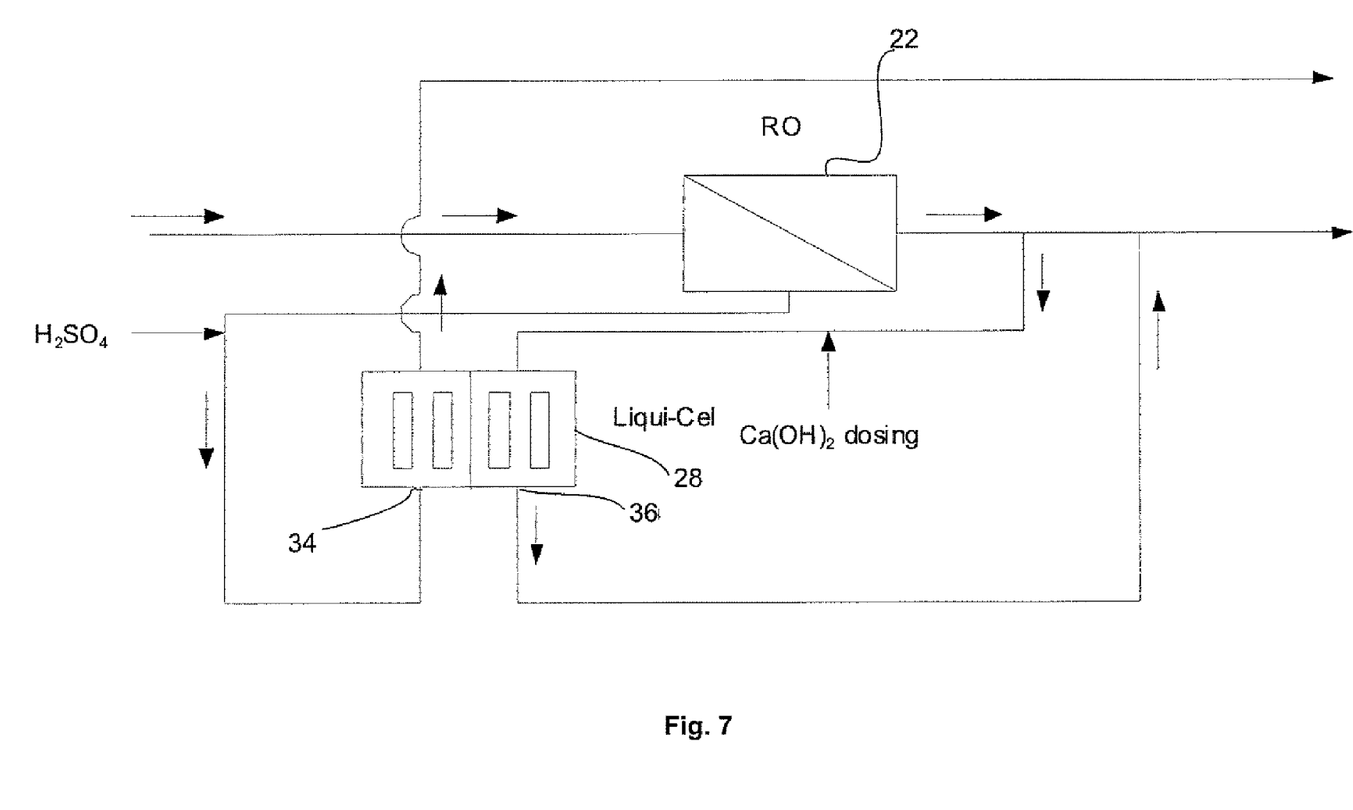
FIG. 7 is a process diagram illustrating an alternative embodiment wherein carbon dioxide ($CO_2$) is sequestered from brine.
Figure 8:
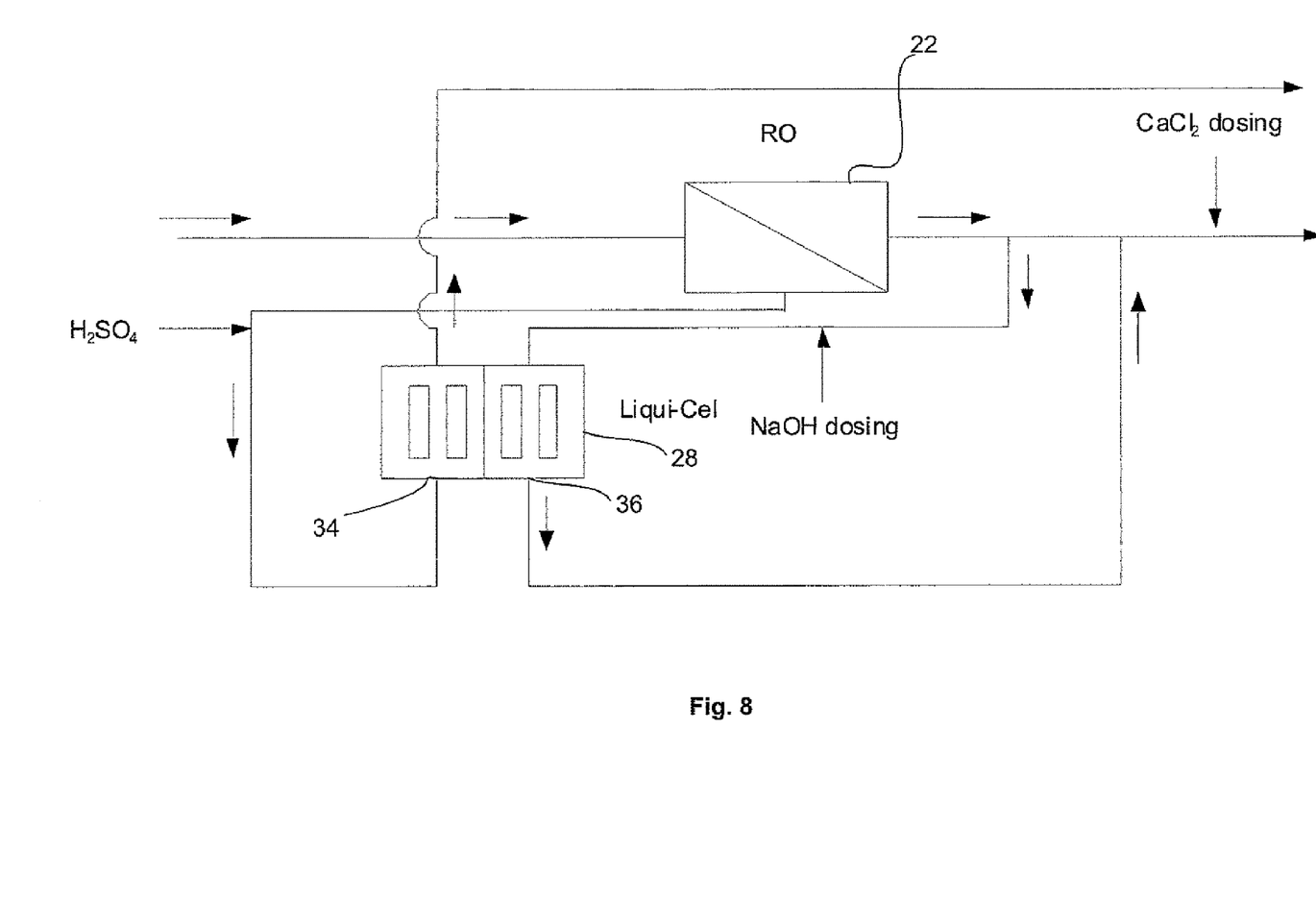
FIG. 8 is a process diagram illustrating an alternative embodiment wherein carbon dioxide ($CO_2$) is sequestered from brine.
Figure 9:
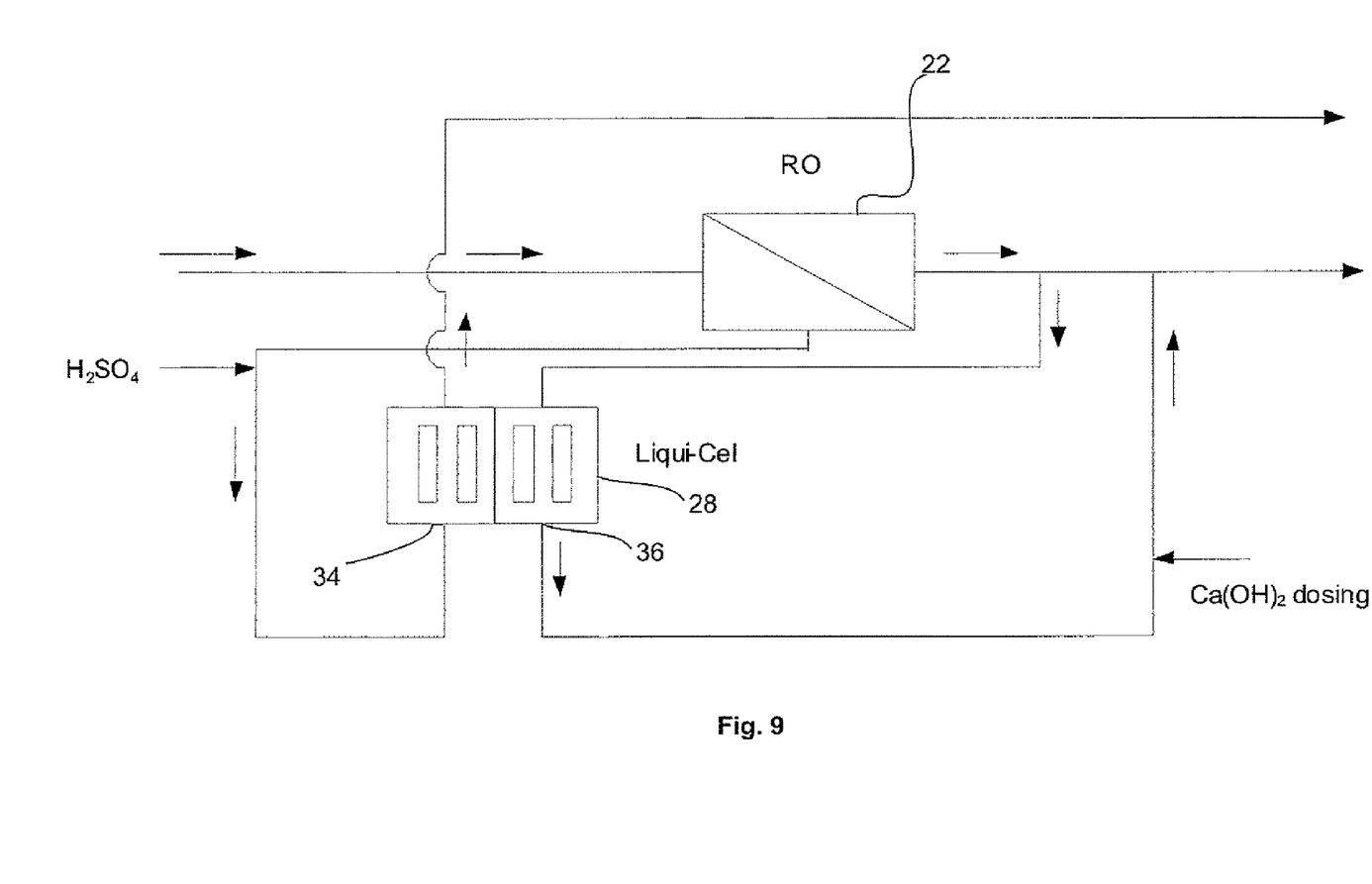
FIG. 9 is a process diagram illustrating an alternative embodiment wherein carbon dioxide ($CO_2$) is sequestered from brine.
Figure 10:
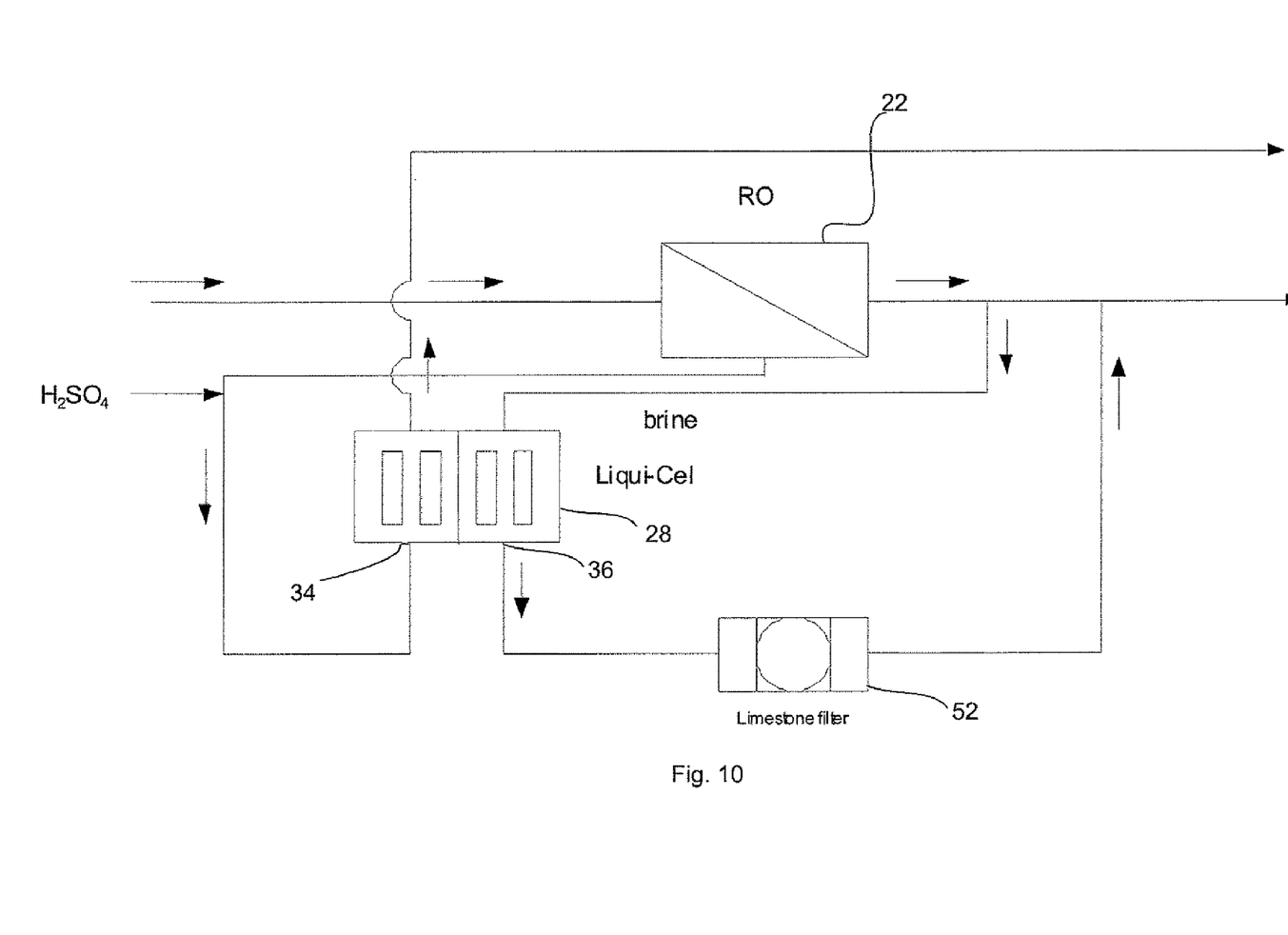
FIG. 10 is a process diagram illustrating an alternative embodiment wherein carbon dioxide ($CO_2$) is sequestered from brine.

In the embodiment of FIG. 7, calcium hydroxide ($Ca(OH)_2$) is added to the upstream side of second flow channel 36 to thereby increase the pH of the permeate and, thereby, increase the transfer rate of the carbon dioxide ($CO_2$) through the gas transfer membranes. The embodiment of FIG. 8 is the same in all respects to the embodiment of FIG. 7, however, sodium hydroxide (NaOH) is used in lieu of calcium hydroxide ($Ca(OH)_2$). In the embodiment of FIG. 9, the calcium hydroxide ($Ca(OH)_2$) dosing is accomplished downstream of the second flow channel. Finally, in the embodiment of FIG. 10, a limestone filter 52 is used in place of calcium hydroxide ($Ca(OH)_2$) dosing.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for re-mineralizing process water in a seawater desalination plant, the method comprising the following steps:
   providing a reverse osmosis (RO) filter including an upstream inlet for seawater and a downstream outlet for RO permeate;
   providing a gas transfer membrane, the membrane including first and second counter current flow channels, each flow channel having upstream and downstream ends, seawater being supplied to the first flow channel and RO permeate being supplied to the second flow channel;

adding sulfuric acid ($H_2SO_4$) to the upstream end of the first flow channel to produce an acidified seawater solution, whereby the sulfuric acid ($H_2SO_4$) reacts with bicarbonate ($HCO_3^-$) present within the seawater to produce carbon dioxide ($CO_2$) gas in accordance with the following equation:

$$H_2SO_4 + HCO_3^- \rightarrow CO_2 \qquad \text{Eq. 1}$$

passing the carbon dioxide ($CO_2$) gas through the gas transfer membrane, whereby the carbon dioxide ($CO_2$) gas is sequestered from the first to the second flow channel;

adding calcium hydroxide ($Ca(OH)_2$) to the downstream end of the second flow channel, wherein the sequestered carbon dioxide ($CO_2$) dissolved in desalinated water reacts with the added calcium hydroxide ($Ca(OH)_2$) to produce calcium bicarbonate ($Ca(HCO_3)_2$) in accordance with the following equation:

$$Ca(OH)_2 + 2CO_2 \rightarrow Ca(HCO_3)_2$$

the produced calcium bicarbonate ($Ca(HCO_3)_2$) being added to the RO permeate to thereby add hardness and alkalinity to the resulting water ($H_2O$).

2. A method for re-mineralizing process water in a seawater desalination plant comprising the following steps:

providing a filter including an upstream inlet for seawater and a downstream outlet for permeate;

providing a membrane, the membrane including first and second flow channels, each flow channel having upstream and downstream ends, seawater being supplied to the first flow channel and permeate being supplied to the second flow channel;

adding an acid to the upstream end of the first flow channel to produce an acidified seawater solution, whereby the acid reacts with bicarbonate ($HCO_3^-$) present within the seawater to produce carbon dioxide ($CO_2$) gas;

passing the carbon dioxide ($CO_2$) gas through the membrane, whereby the carbon dioxide ($CO_2$) gas is sequestered from the first to the second flow channel and is dissolved in the permeate;

adding a base to the downstream end of the second flow channel, wherein the sequestered carbon dioxide ($CO_2$) dissolved in the permeate reacts with the base to produce calcium bicarbonate ($Ca(HCO_3)_2$), the produced calcium bicarbonate ($Ca(HCO_3)_2$) being added to the permeate to thereby add hardness and alkalinity to the resulting water ($H_2O$).

3. The method as described in claim 2 wherein the acid added to the upstream end of the first flow channel is sulfuric acid and wherein the carbon dioxide gas is produced in accordance with the following equation:

$$H_2SO_4 + HCO_3^- \rightarrow CO_2 \qquad \text{Eq. 1.}$$

4. The method as described in claim 2 wherein the base added to the downstream end of the second flow channel is calcium hydroxide and wherein the calcium bicarbonate is produced in accordance with the following equation:

$$Ca(OH)_2 + 2CO_2 \rightarrow Ca(HCO_3)_2.$$

5. The method as described in claim 2 wherein the filter is a reverse osmosis filter.

\* \* \* \* \*

UNITED STATES PATENT AND TRADEMARK OFFICE
CERTIFICATE OF CORRECTION

PATENT NO. : 7,771,599 B1  Page 1 of 1
APPLICATION NO. : 12/400765
DATED : August 10, 2010
INVENTOR(S) : Choi et al.

It is certified that error appears in the above-identified patent and that said Letters Patent is hereby corrected as shown below:

Title Pg, Item (73) Assignee, delete "Doosan Hydro Technology, Inc., Tampa, FL (US)" and insert
-- Doosan Heavy Industries & Construction Co., Ltd., Gyeongsangnam-do, (Rep of Korea) --

Signed and Sealed this

Fourteenth Day of September, 2010

David J. Kappos
*Director of the United States Patent and Trademark Office*